United States Patent [19]

Thelen

[11] Patent Number: 5,022,276
[45] Date of Patent: Jun. 11, 1991

[54] DEVICE FOR HOLDING A ROTOR

[75] Inventor: Dieter Thelen, Darmstadt, Fed. Rep. of Germany

[73] Assignee: Carl Schenck AG, Fed. Rep. of Germany

[21] Appl. No.: 54,324

[22] Filed: May 26, 1987

[30] Foreign Application Priority Data

Jan. 29, 1987 [DE] Fed. Rep. of Germany ....... 8701379

[51] Int. Cl.$^5$ .......................................... G01M 15/00
[52] U.S. Cl. ................................................. 73/865.3
[58] Field of Search ........................... 73/865.3, 118.1; 494/10; 416/134 R, 106, 135, 136 A, 136 R, 500, 145; 464/92, 93, 94, 95; 74/572, 573 R, 574

[56] References Cited

U.S. PATENT DOCUMENTS

| 1,860,771 | 5/1932 | Bugatti ................................. 74/574 |
| 4,145,936 | 3/1979 | Vincent et al. ....................... 74/574 |
| 4,182,138 | 6/1980 | McGuire ............................... 74/572 |
| 4,234,200 | 11/1980 | Orem et al. . |
| 4,285,251 | 8/1981 | Swartout ............................... 74/572 |
| 4,487,552 | 12/1984 | Haase et al. ........................... 417/64 |
| 4,680,984 | 7/1987 | Wahling et al. ...................... 74/574 |
| 4,694,689 | 9/1987 | Kawasaki ............................. 73/118.1 |
| 4,701,106 | 10/1987 | Sasaki .................................. 425/129 R |

FOREIGN PATENT DOCUMENTS

| 2507695 | 8/1975 | Fed. Rep. of Germany . |
| 3001180 | 7/1980 | Fed. Rep. of Germany . |
| 3334393 | 4/1985 | Fed. Rep. of Germany ........ 74/574 |
| 3535197 | 4/1986 | Fed. Rep. of Germany . |
| 2492098 | 10/1980 | France . |
| 0146745 | 9/1983 | Japan .................................... 74/574 |
| 914240 | 12/1962 | United Kingdom .................. 74/574 |
| 2173602 | 3/1985 | United Kingdom . |

Primary Examiner—Robert Raevis
Attorney, Agent, or Firm—Connolly & Hutz

[57] ABSTRACT

A device for maintaining rotors centered during spin testing thereof includes a disc-like or sleeve-like centering element positioned between the exterior of a spin arbor and the interior of an axial bore hole extending through the rotor under test. Specifically designed circumferential areas on the centering elements are elastically deformable in a radial direction to maintain contact with the rotor even when the bore hole thereof slightly expands by the centrifugal forces generated during the spin test.

2 Claims, 4 Drawing Sheets

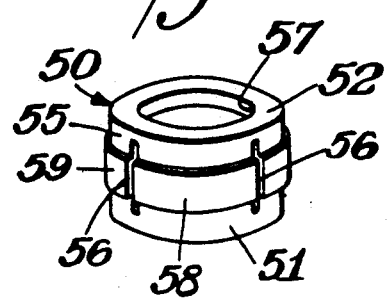
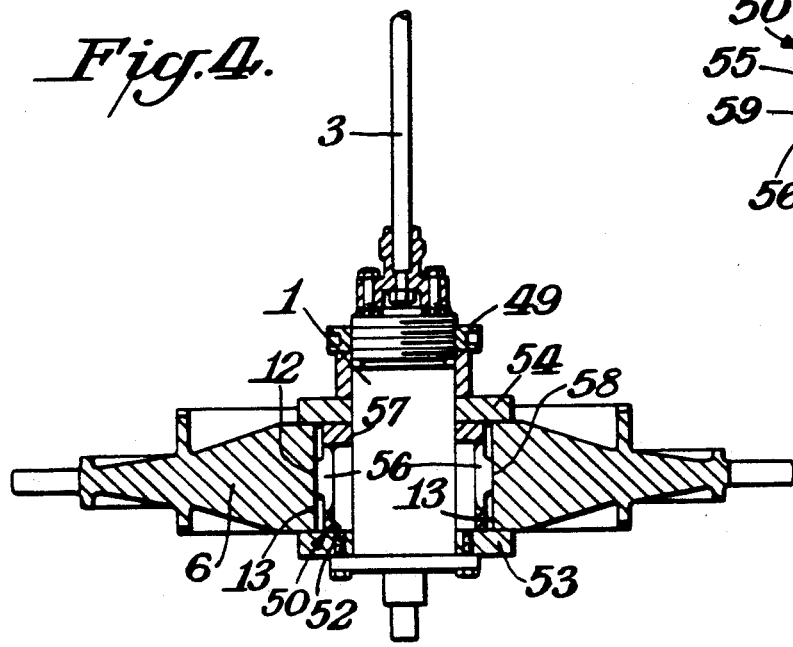
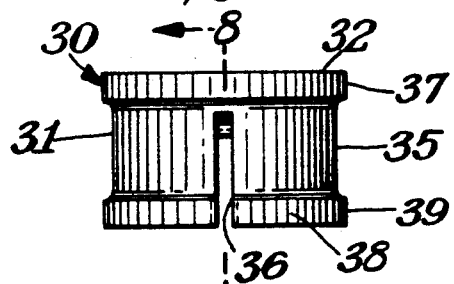
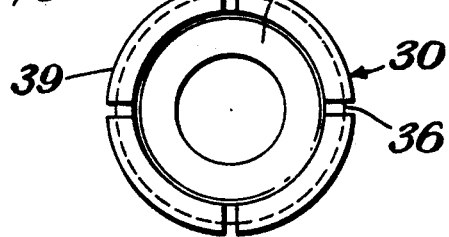
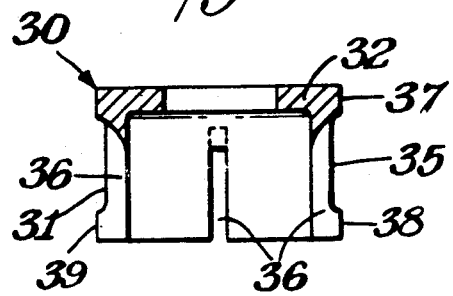

DEVICE FOR HOLDING A ROTOR

BACKGROUND OF THE INVENTION

The present invention relates to a device for holding a rotor on the spin arbor of a rotor spin test machine. The spin arbor is equipped with a first clamping element and a second clamping element with axial freedom which contact the face areas of the rotor. Centering surfaces are provided between the spin arbor and rotor for the co-axial alignment of the spin arbor and rotor when the rotor is not rotating.

Such devices serve the purpose of holding a rotor on the spin arbor of a rotor spin testing machine. For safety reasons, rotors that are exposed to high loads in service due to centrifugal forces must be subjected to test runs on spin test stands at speeds that are above the maximum service speed. In this manner, rotors of insufficient strength are detected and eliminated.

Rotors must be centered when they are clamped onto the spin arbor of the spin testing machine in order to avoid large vibration amplitudes during the overspeed test. To achieve centered clamping of a rotor having an axial bore hole, the spin arbor or a part connected with same, is equipped with a centering surface, for instance a collar, which locates the centering surface of the rotor, for instance the face area of the axial bore hole of the rotor. By means of these centering surfaces, the rotor can be centered during mounting. A rotor, thus centered, is positioned between a first clamping element which is preferably fixed to the spin arbor and a second clamping element with axial freedom, and is clamped securely in this centered position between the clamping elements by one or several screw connectors, for example.

Based on the design of the spin testing machine, a certain amount of eccentricity of the rotor is permissible, which generally can be safely accommodated even if the rotor centering is not very accurate. Because of the action of centrifugal forces upon the material of the rotor and the resulting expansion of the axial bore hole of the rotor, it is possible, that the centering of the rotor deteriorates to non-permissible values.

SUMMARY OF THE INVENTION

Accordingly, an object of the present invention is to provide a device that assures centering even at high spin test speeds and therefore can accommodate large expansions due to centrifugal forces of the axial bore hole of the rotor. At the same time the device is simple in design, inexpensive to manufacture and installation can be quickly accomplished.

A disc-like or sleeve-like centering element is located between the spin arbor and the rotor and this element has several peripheral areas along the circumference thereof that are separated from each other by separation slots. The peripheral areas are elastically deformable in a radial direction and possess centering surfaces which are in contact during the spin test with the wall of the axial bore hole of the rotor thereby providing a true centering surface.

With the present invention, the rotor is centered and clamped in a simple manner. Also, during the spin test, the rotor will always remain centered to the spin arbor and therefore be centered with respect to the bearing arrangement. These characteristics are also present when the axial rotor bore hole expands due to centrifugal forces.

The axial bore hole size of the rotor expands in a radial direction at high circumferential speeds by amounts that lie in the order of 1/10 of one percent. On the other hand, the clamping elements of the spin arbor that assure the rotor is axially fixed barely extend at all in the radial direction. Because of the inventive intermediate centering element with elastically deformable circumferential areas between the spin arbor and the rotor, centering within given tolerances is assured independent of the expansion of the rotor bore hole because these circumferential areas act as springs as a result of their elastic deformability.

The spring constant of the circumferential section is chosen according to the relationship of $$C = \omega^2 \frac{m \times M}{m + M}$$

where $$\omega = 2\pi \frac{n_{max}}{60}$$

= the angular velocity at the maximum speed that occurs during the spin test; n max is the maximum speed that occurs during a test spin (rad/sec); m = the mass of the spin arbor and clamping element (in kg); and M = mass of the rotor to be investigated.

The circumferential area of the centering elements is radially and outwardly deformed as a result of the action of centrifugal forces. Because of the spring action, the rotor is maintained in a centered position with respect to the spin arbor. The radial deformation in the outward direction can be increased by applying a pretension to the circumferential area of the centering element during the mounting process, for example.

A further development of the invention proved advantageous in cases of long rotor hubs where several, preferably two, centering elements are provided in the direction of the rotor axis between the spin arbor and rotor.

An especially inexpensive design is presented in a further development whereby the centering disc has an inner ring located on the spin arbor, an outer ring, and interconnecting bridges for both. Separating slots approximately extend to the outer diameter of the inner ring, and such discs are simply made by flame cutting or stamping. With flame cutting only a small amount of machining is needed. The outer ring of the disc acts as a spring with its circumference sections between the separation slots.

An advantageous further development of the invention includes protrusions on each outer circumferential area, preferably centered between the separation slots. The protrusions are defined on their outer surface by a lateral area co-axial to the rotor axis, where the diameter of the defining cylinder is equal to or larger than (preferably larger) the axial bore hole of the rotor. The protrusions assure a definite loading of the elastically deformed circumferential areas. Machining of the outer circumference of the centering discs is limited to the protrusions which contributes to lower manufacturing cost.

If the axial bore hole of the rotor is enlarged at both ends as a result of its design, the arrangement of the one centering disc on each end of the bore hole of the rotor is especially useful.

A further development is particularly suited for rotors with small axial bore holes. The centering sleeve has cylinder-like cross-section, and the bottom opening of the sleeve is preferably located by the spin arbor. An annular protrusion is provided on the outside surface, and the diameter of the protrusion is equal to or larger than (preferably larger) the axial bore hole of the rotor in order to achieve pretensioning.

In cases of unequal extension of the axial bore hole, the centering sleeve should advantageously be arranged so that the bottom part of the cylinder-like centering sleeve is on the end of the rotor having the smaller extension. The cylinder-like centering sleeve advantageously has the annular protrusion in the middle between the sleeve ends.

In another embodiment of the invention, the annular protrusion is provided at the end of the centering sleeve which is away from the bottom. This arrangement is particularly advantageous with rotors with long axial bore holes and several centering sleeves.

For control of the spring action, the separation slots on the centering sleeve are only present in the area of the annular protrusion which forms the centering surface for the rotor. Such slots can be machined in simple form by means of a slot cutting saw beginning at the circumference and inwardly progressing therefrom.

In the case of an axial rotor bore hole of small diameter, it is especially advantageous to design the centering element as one piece consisting of spin arbor and centering sleeve. This arrangement of separate clamping elements can be avoided by providing protrusions as clamping elements at the outer circumference of the centering sleeve so that they contact the faces of the rotor. Further, it is purposeful to provide several, preferably two annular protrusions with centering surfaces on the centering sleeve.

BRIEF DESCRIPTION OF THE DRAWINGS

Novel features and advantages of the present invention in addition to those noted above will become apparent to persons of ordinary skill in the art from a reading of the following detailed description in conjunction with the accompanying drawing wherein similar reference characters refer to similar parts and in which:

FIG. 4 is a view similar to FIG. 1 but illustrating another embodiment of the invention;

FIG. 5 is a perspective view of the centering element of the holding device of FIG. 4;

FIG. 6 is a side elevational view of another centering element, according to the present invention;

FIG. 7 is a bottom plan view of the centering element shown in FIG. 6;

FIG. 8 is a sectional view taken along line 8—8 of FIG. 6;

DETAILED DESCRIPTION OF THE INVENTION

Figure 1:
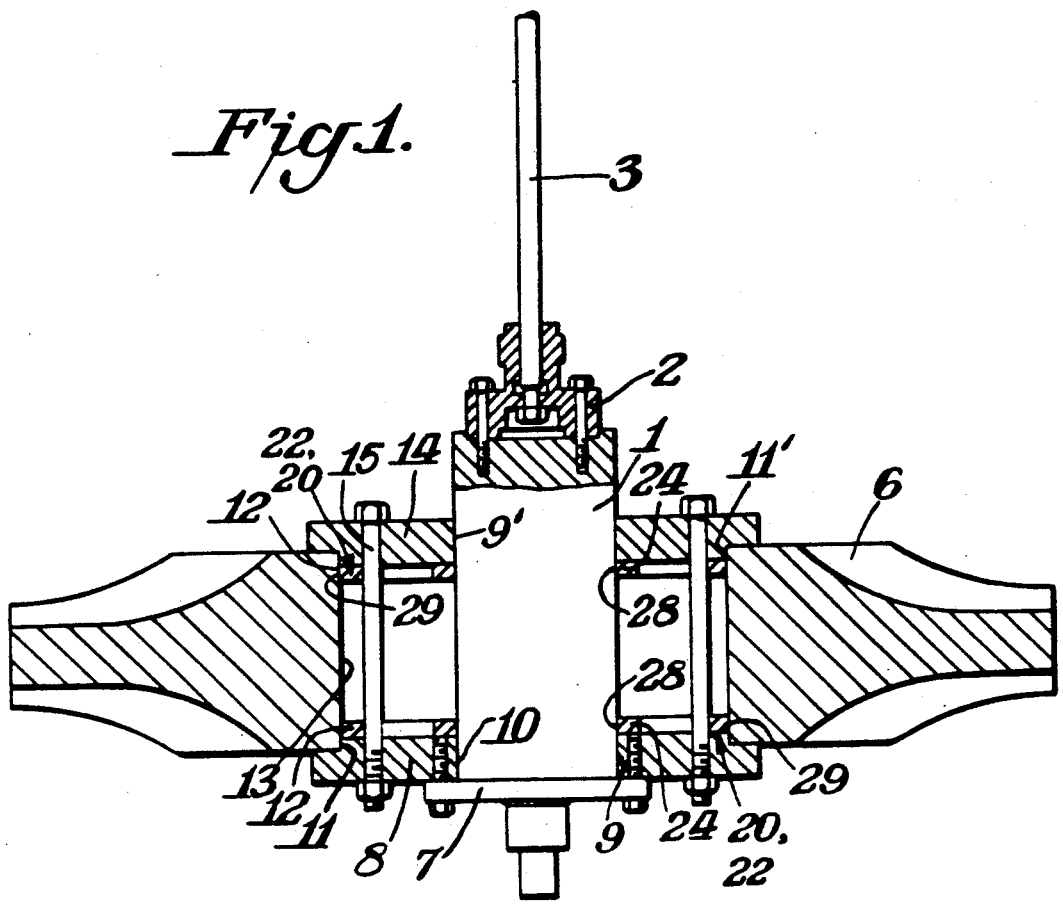
FIG. 1 is a side elevational view of a device for holding a rotor, according to the present invention, with portions thereof shown in section.

Referring in more particularity to the drawing, FIG. 1 shows a spin arbor 1 connected to a drive shaft 3 by means of a coupling 2. The drive shaft 3 is vertically arranged and is held at some distance from the rotor in both radial and axial bearings as is well known in the art. The spin arbor includes a device for holding a rotor 6 having an axial bore hole 13. Also, spin arbor 1 has a flange 7 to which is fixed a first clamping element 8 at the lower side of rotor 6. A further clamping element 14 is located at the upper side of the rotor.

The clamping element 8 is designed in the shape of a disc and has a centering surface 9 formed by the wall of an axial bore hole extending through that clamping element. The centering surface is exactly fitted to the centering surface of spin arbor 1. A further centering surface 11 is provided on the outer circumference of clamping element 8 in the form of a pilot diameter in its outer face. On this centering surface 11 is located a centering surface 12 on rotor 6 which is formed by the axial rotor bore hole 13.

Clamping element 14 is similar in its design to clamping device 8. However, it does not include means for fastening to spin arbor 1 and instead is movable along the axis of the spin arbor 1 having the necessary clearance to so move. Clamping element 8 may be fastened to arbor 1 by a screw connection (not indicated). Moreover, centering surfaces 9', 10 are located between clamping element 14 and spin arbor 1 while centering surfaces 11', 12 are located between clamping element 14 and rotor 6. These surfaces are arranged in the same manner previously described in connection with clamping element 8.

The face surface areas of clamping elements 8, 14 make contact with the face surface areas of rotor 6 by means of the tension exerted by a screw connection 15. The tension of the screw connection is chosen so that transmission of the torque necessary to accelerate the rotor 6 is assured without any slippage by the frictional resistance between rotor 6, clamping element 8 and spin arbor 1.

Inserted at each end of the axial bore hole 13 is a disc-shaped centering element 20, one positioned next to the other next to clamping element 8 and 14. The centering elements close off the axial bore hole 13. Insertion of the centering elements 20 into the axial bore hole 13 is accomplished while the circumferential areas 21 of the centering discs 22 are under radial and inwardly directed pretension.

Centering disc 22 essentially comprises an outer ring 23 and an inner ring 24 connected together by four spoke-like bars 25 equidistantly distributed along the circumferences of the rings. Each bar consists of two sections separated from one another by a separation slot 26. The separation slot extends from the outer circumference of centering disc 22 to approximately the outer diameter of inner ring 24. For fastening the centering disc 22 to the clamping elements 8, 14 fastener holes 27 are provided on the inner ring in radial alignment with the separation slots 26. Four circumferential areas 21 (I, II, III and IV) are defined by the separation slots 26 on the centering disc each such area comprising an outer ring section, two half bar sections, and an inner ring section. The inner ring 24 has a centering surface 28 on its inner circumference which locates the centering surface 10 of the spin arbor. Also, protrusions are provided on the outer ring section of each circumferential area I–IV. The protrusions are centered between the separation slots 26, and the outside surfaces 29 of which define a cylindrical surface which locates centering surfaces 12 of the axial bore hole 13 of rotor 6. The diameter D of this cylinder is selected slightly larger than the diameter of the axial bore hole 13 so that the protrusions on the circumferential areas 21 of the centering disc 22 contact the wall of the axial bore hole 13 with a light pretension.

When rotor 6 reaches its test speed, the rotor may radially expand by amounts which lie in the region of 1/10 of one percent. Clamping elements 8, 14 on the other hand, because of their geometry, expand only negligibly, and in this case the centering surfaces 12 of the rotor slightly separate from the centering surfaces 11, 11' of the clamping elements 8, 14. Without the centering discs 22, the rotor would be shifted out of its central position achieved during mounting, into an intolerable position of eccentricity with respect to the shaft center. Such shifting causes intolerably high vibration amplitudes.

However, with the centering discs 22 appropriately positioned within the rotor bore hole 13, the central position of rotor 6 and shaft 1 is assured within allowable tolerance limits. As a result of the action of centrifugal forces, the rotor may be forced to shift out of its coaxial position with speed arbor 1 but such shifting is prevented by a portion of the circumferential area 22 with centering surfaces 29 being compressed while the diametrically opposite circumferential area expands due to centrifugal forces and/or spring forces. Thus, contact of the centering discs with the wall of the bore hole is maintained.

Figure 2:
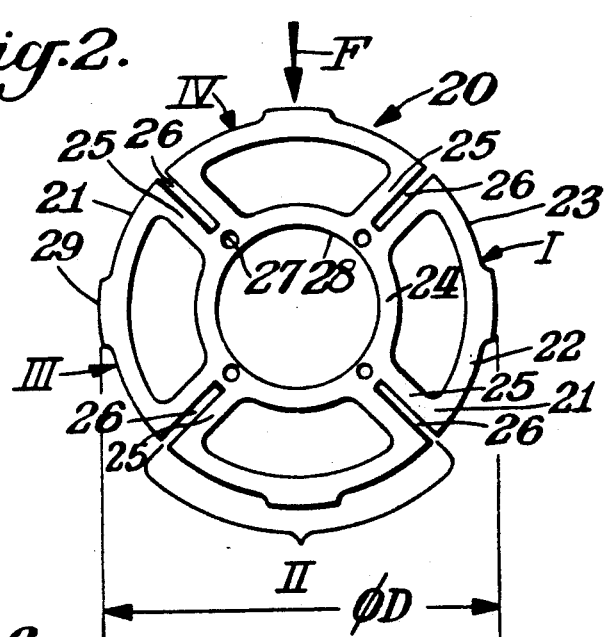
FIG. 2 is a top plan view of the centering element of the holding device of FIG. 1.

As shown in FIG. 2, a force F acting on a protrusion of the outer circumference is counteracted by a resultant force based on the elastic deformation of this circumferential area. Also, based on the load relief on the opposite side, an intolerably large eccentric repositioning of the rotor 6 is prevented. The spring characteristics of the circumferential areas 21 are selected so that the rotor when affected by centrifugal forces will be concentrically held relative to arbor 1 or at least within permissible eccentricity tolerances.

FIGS. 4 and 5 illustrate an alternate embodiment for holding a rotor 6. Here, an essentially cylinder-like centering sleeve 52 functions as a centering element 50 between rotor 6 and spin arbor 1. As shown best in FIG. 5, the centering sleeve has an open bottom and lateral areas 51, 55. Four equally sized elastically deformable circumferential areas are divided by separation slots 56. The separation slots start near the end of the lateral area 51 and end within the transition of the lateral area 55 and the bottom. The separation slots are easily machined by means of a slot cutting saw or disc shaped milling cutter, for example. The inner wall of the bore hole of centering sleeve 52 provides a centering surface 57 which locates the spin arbor 1. In the middle between the end faces of the centering sleeve 52, the annular protrusion 59 forms the centering surfaces 58 which are coordinated to the bore hole of rotor 6.

As described above, two clamping elements 53, 54 are provided on the spin arbor 1 between which the rotor 6 is clamped in axial direction by means of a nut 49. The clamping element 53 is solidly fastened to the spin arbor 1.

The centering sleeve 52 is inserted with slight pretension in the space between the wall of the axial rotor bore hole 13 and the spin arbor 1. This insertion of the centering sleeve 52 centers the device during mounting without additional centering surfaces. The clamping elements 53, 54 may, however, be equipped with a centering recess similar to the clamping elements 8, 14 shown in FIG. 1 for centering purposes when the rotor is not rotating. The open bottom of cylinder-like centering sleeve 52 is next to the clamping element 54.

Figure 3:
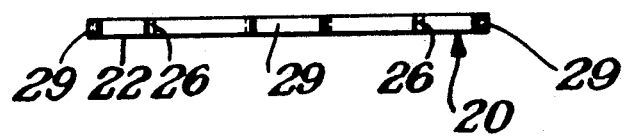
FIG. 3 is an end elevational view of the centering element of FIG. 2.

Functionally, the centering sleeve 52 corresponds to the centering discs 22 shown in FIG. 3. Any attempt to shift the rotor out of its central position as a result of the action of centrifugal forces causes part of the elastically deformable circumferential surface of the area 58 to compress while the diametrically opposed circumferential area expands. Thus contact between the centering element and the bore hole is maintained. The spring characteristics of the circumferential areas between slots 56 are selected so that the rotor when affected by centrifugal forces remains centered with the arbor or at least within permissible eccentricity tolerances.

FIGS. 6–8 show a centering sleeve 32 similar in some respects to centering sleeve 52 of FIGS. 4 and 5. Centering sleeve 32 has an open bottom and outside surface 35 in the form of elastically deformable circumferential areas 31 consisting of four equally sized elastically deformable circumferential areas divided by separation slots 36. The separation slots start at the open end of the cylinder-like centering sleeve 32 and stop short of the upper end thereof. An annular protrusion at the upper end forms centering surface 37 which locates the rotor 6 when the rotor 6 is not rotating. The outside surface 35 of the centering sleeve 32 is equipped at its other end with an annular protrusion 39. Slots divide the protrusion 39 into the elastically deformable circumferential areas which form the centering surfaces 38. Surfaces 38 locate the axial bore of the rotor during the spin test. In its function the centering sleeve 32 corresponds to the previously described centering elements, especially centering sleeve 52.

Figure 9:
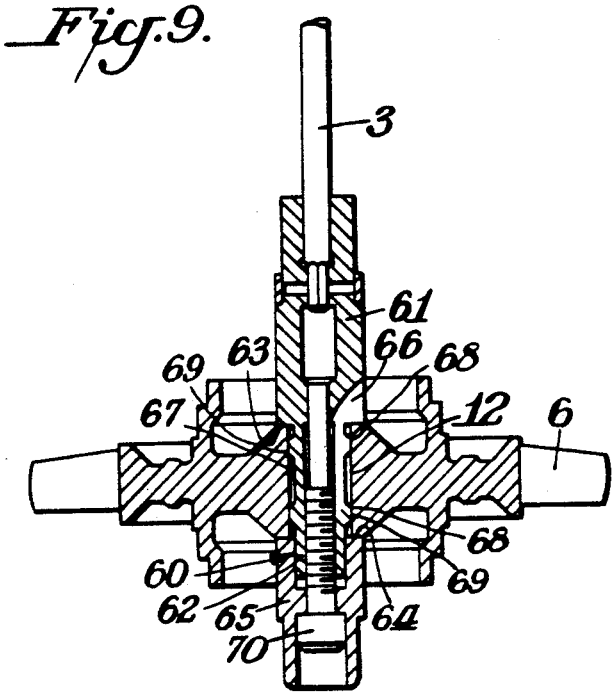
FIG. 9 is a view similar to FIGS. 1 and 4 but illustrating still another embodiment of the invention.
Figure 10:
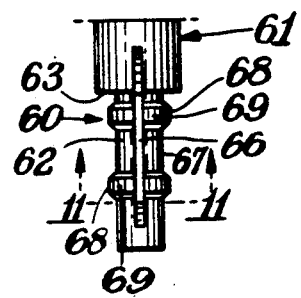
FIG. 10 is a side elevational view of the centering element of the holding device of FIG. 9.
Figure 11:
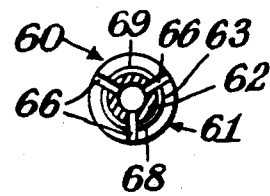
FIG. 11 is a sectional view taken along line 11—11 of FIG. 10.

The alternative device illustrated in FIGS. 9–11 is especially suitable for a rotor 6 having a small diameter axial bore hole. Here, a centering element 60 is formed as a one piece construction with the spin arbor. The spin arbor 61 is hollow and hold the drive shaft 3 which is inserted into one end of the arbor and secured thereto. The transmission of torque is assured by means of fitted sections of the spin arbor 61 and the drive shaft 3, as shown best in FIG. 9. The spin arbor has a step on its outer circumference that forms a clamping element 63 in the longitudinal direction against which the rotor 6 makes contact. The rotor is clamped by means of a sleeve 65 which is centered by means of a collar on the end of the spin arbor 61. With the aid of a central screw 70, the rotor is secured between a further clamping element 64 (sleeve 65) and element 63. The circumferential area 67 is made elastically deformable in a radial direction by three separation slots 66 which are equidistantly distributed around the circumference. The separation slots extend in an axial direction beyond the point where the clamping elements 63, 64 are located and can be machined with any suitable tool. Annular collar-like protrusions 69 are located at each end of the circumferential area 67 and protrusion locate the axial bore hole of the rotor.

By means of the circumferential area 67 of the spin arbor 61 rotor 6 is centered during mounting and remains centered during the overspeed run. The mode of action of the circumferential areas 67 of the centering element 60 defined by the separating slots 66 corresponds in principle to the mode of action of the centering elements 20, 30 and 50, described above.

Figure 12:
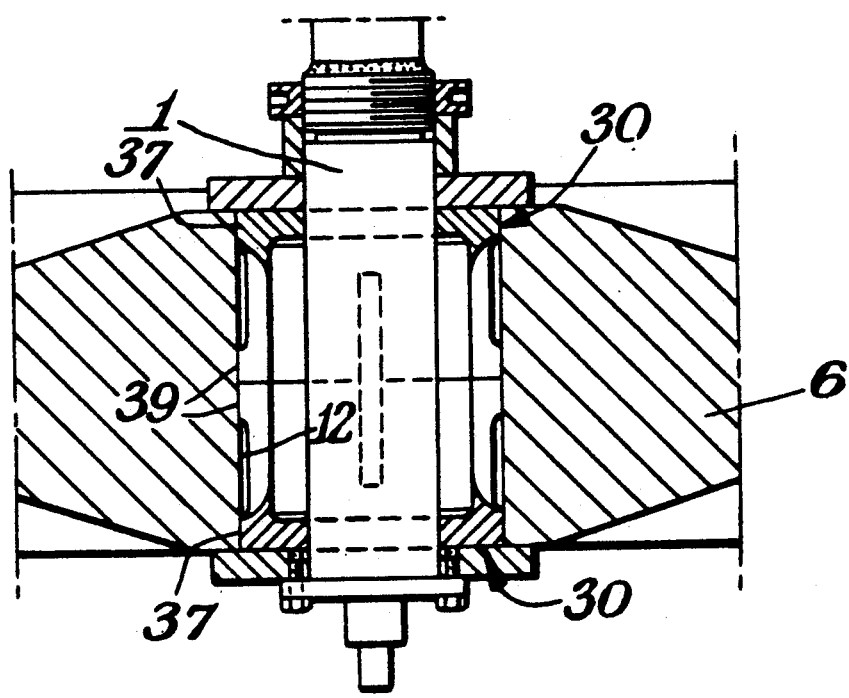
FIG. 12 is a view similar to FIGS. 1, 4 and 9 but illustrating two centering elements of the type shown in FIGS. 6–8.

FIG. 12 illustrates two centering elements 32 positioned between spin arbor 1 and rotor 6. This arrangement is particularly advantageous in those cases where the rotor hub is long.

What is claimed is:

1. A device for holding a rotor having an axial bore hole on a spin arbor of a rotor spin testing machine, comprising axially spaced apart first and second clamping elements with axial freedom therebetween constructed and arranged to engage the rotor and centrally align the rotor with the spin arbor, at least one centering element positioned between the exterior of the spin arbor and the interior surface of the axial bore hole of the rotor and centered with respect to the spin arbor, the centering element having a body with several circumferential areas arranged along the outer circumference thereof, separation slots separating the circumference into the circumferential areas, each separation slot forming a though hole radially extending through the body of the centering element, each circumferential area including a springly radially deformable centering surface portion engaging the interior surface of the rotor bore hold throughout the rotor spin test for centering the rotor to the spin arbor even when the size of the axial bore hole slightly expands, the centering element being in the form of a sleeve having an annular protrusion with several circumferential areas that engage the interior surface of the axial bore hole of the rotor, the annular protrusion having a diameter slightly larger than the diameter of the axial bore hole of the rotor whereby the sleeve centering element is pretensioned when operatively positioned, and separation slots extending through the annular protrusion to thereby divide the protrusion into the radially deformable centering portions.

2. A device for holding a rotor having an axial bore hole on a spin arbor of a rotor spin testing machine, comprising axially spaced apart first and second clamping elements with axial freedom therebetween constructed and arranged to engage the rotor and centrally align the rotor with the spin arbor, at least two centering elements positioned between the exterior of the spin arbor and the interior surface of the axial bore hole of the rotor and centered with respect to the spin arbor, each of the centering elements having a body with several circumferential areas arranged along the outer circumference thereof, separation slots separating the circumference into the circumferential areas, each separation slot forming a through hole radially extending through the body of the centering element, each circumferential area including a springy radially deformable centering surface portion engaging the interior surface of the rotor bore hold throughout the rotor spin test for centering the rotor to the spin arbor even when the size of the axial bore hold slightly expands.

* * * * *